C. Carter,
Mortising Machine.
No. 82,692. Patented Oct. 6, 1868.
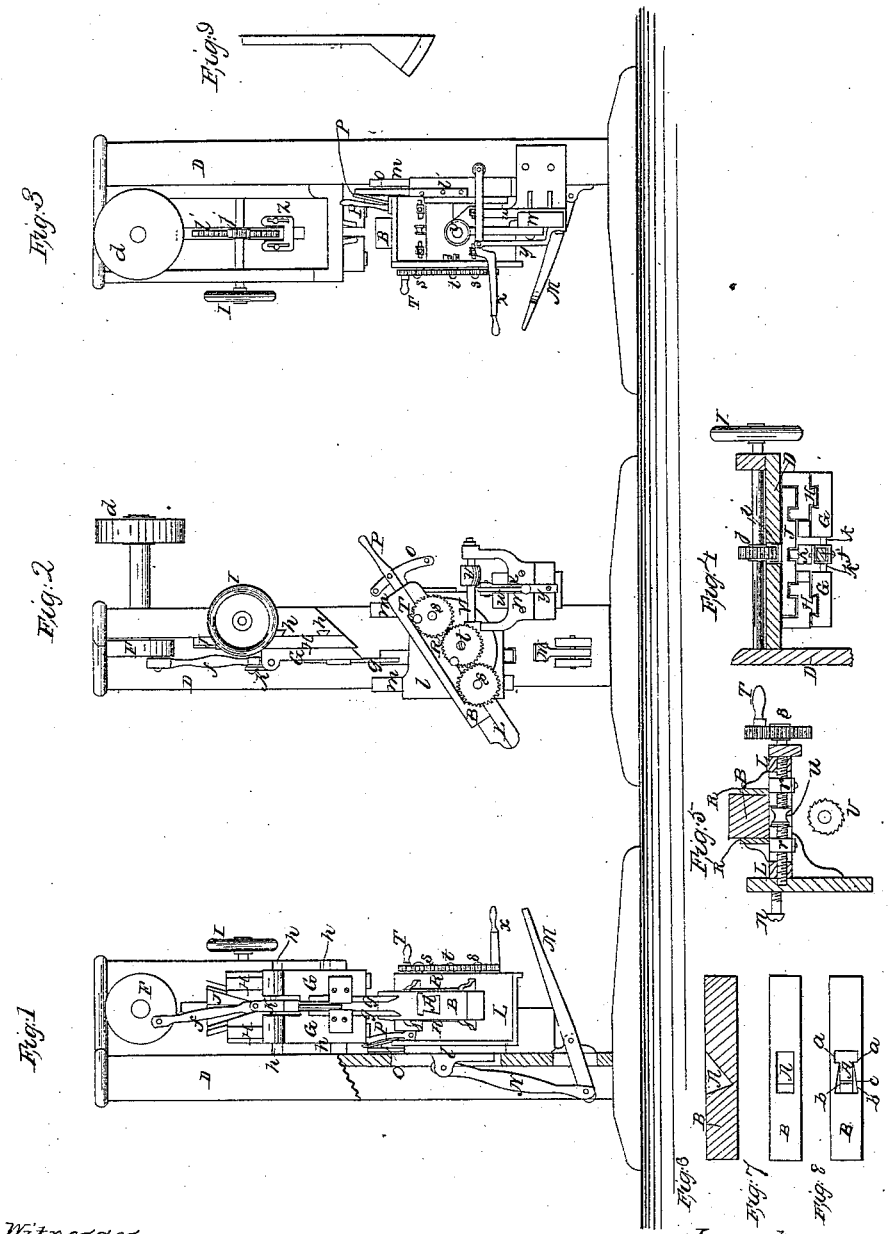
Witnesses:
J. D. Gillett
Dan'l Duncan
Inventor:
Chas Carter
per F. A. Molz attys

UNITED STATES PATENT OFFICE.

CHARLES CARTER, OF AUBURN, NEW YORK.

IMPROVEMENT IN MORTISING-MACHINES.

Specification forming part of Letters Patent No. 82,692, dated October 6, 1868.

*To all whom it may concern:*

Be it known that I, CHARLES CARTER, of Auburn, in the county of Cayuga and State of New York, have invented a new and Improved Mortising-Machine; and I do hereby declare that the following is a full, clear, and exact description thereof, which will enable those skilled in the art to make and use the same, reference being had to the accompanying drawings, forming part of this specification, in which—

Figure 1 is a front view of my invention. Fig. 2 is a side view, and Fig. 3 is a rear view. Figs. 4, 5, 6, 7, 8, and 9 are detail views.

Similar letters of reference indicate like parts in all the figures.

This invention relates to an improved mortising-machine for finishing the throats of planes after the main part of the mortise has been roughened out by a previous machine, whereby an important saving in labor is made, as hereinafter more fully explained.

In the accompanying drawings, Figs. 6 and 7 show the plane-wood as it comes from the preparatory machine, and Fig. 8 shows the mortise completed. When the plane wood or block comes from the first machine it has merely a plain V-shaped mortise, A, cut in it, and the present machine takes the block in that form and cuts the grooves $a$ $a$, Fig. 8, for holding the wedge and plane-irons, and also cuts the mortise or throat entirely through the block, as shown by $c$, and afterward gives the forward part of the mortise upward clearance, (technically called "slabbing,") $b$ $b$. This finishing labor has heretofore been done wholly by hand; but by the use of this machine the finishing is done with much greater rapidity and with more accuracy. An ordinary day's labor by the machine finishes about five hundred blocks.

D represents the frame-work. $d$ is the driving-pulley. F is the crank-wheel, and $f$ the driving-pitman which drives the tool-holding slides G G, Figs. 1, 2, and 4. $g$ $g$ are the mortising-chisels.

The slides G G travel vertically on guides H H, Fig. 1, (see also top view of guides H H, Fig. 4,) and the guides H H move laterally in guides $h$ $h$, Figs. 1 and 2. The lateral movement of the guides H is controlled by a hand-wheel, I, rack, $i$, pinion $j$, and grooved wedge J, Figs. 1, 3, and 4.

The pitman $f$ connects with the tool-holding slides G G by means of a center-piece, K, which travels in a guide-groove in the center of wedge J, and this center-piece K, Figs. 1 and 4, has a pin, $k$, Fig. 4, which connects on either side with the said tool-holding slides, and in this manner the pitman has control of the vertical movement of the slides G, while said slides are free to be moved laterally by wedge J, and thus carry the chisels from each other laterally.

L is a table upon which the work is secured. This table is secured to a plate, $l$, Figs. 1 and 2, by a pivot, $n$, Fig. 5, so that the table can be tilted endwise, to present the work to the tool at different angles, and the table is held in its several positions by a rack, $o$, Fig. 2, which has holes for receiving a pin attached to a flat spring, $p$, Fig. 3. The plate L, to which the table is pivoted, is arranged to slide vertically on guides $m$ $m$, Fig. 2, and raise or lower the table at different stages of the work, and this slide $l$ is operated by a foot-lever, M, Fig. 1, which connects with the sliding plate $l$ by means of a connecting-rod, N.

The table L is provided with a chuck or clamp, by which the work is brought correctly into position under the tool, and rapidly secured to the table. This chuck consists in two side pieces or jaws, R R, Figs. 1 and 5, which hold the block B by grasping its sides. The jaws R have studs $r$ $r$, Fig. 5, which project downward through transverse slots in the table, and engage with right and left hand screws S. There are two of these screws S S, as shown in Figs. 1, 2, and 3, and they are geared together by an idle-wheel $t$, so as to have a like movement, and are operated by a crank, T. The center of each screw has a collar, $u$, Fig. 5, which fits in a corresponding recess in the bed of the table, to hold the screws from moving longitudinally.

A small circular saw, U, Fig. 5, is fixed on the shaft V, Fig. 2, and arranged to move vertically by means of a hand-lever, $x$, and is used to saw out the lower part of the throat. The lever $x$ connects with slide W by a spring-standard, $y$, Fig. 3.

The arbor or shaft V of the saw is supported in a slide, W, which slides vertically on guides $w$, Figs. 2 and 3, so that by lifting on the lever $x$ the edge of the saw passes through a slot in the table and comes in contact with the plane-wood immediately below the mortise A. The saw is driven by the pulley $b$.

Z, Fig. 3, is an adjustable stop, which is set to intercept the rack $i$ at any desired point, and by this means stop the spread of the chisels at the right point every time, and give an exactly uniform breadth of cut in all work of the same character.

I do not wish to confine myself to the use of the wedge J for spreading the tool-slides G G, as a pair of right and left hand screws may be employed, and geared to act in concert much like those used for spreading the jaws f the chuck R R; or a set of cams may be made to accomplish this purpose readily. For the slabbing part of the work another set or pair of chisels are used, which are shaped as shown in Fig. 9.

The operation is as follows: The block B is placed on the table L, with the table secured at the upper end of the rack $o$, and the table is then elevated by the foot-lever M, and, by moving the block as the table is raised, the chisels $g$ are guided into the mortise A. When the chisels have occupied the mortise A the operator allows the block to slide down the inclined table until the bed-line or rear angle of the mortise rests against the chisels, and by this means the block is brought to a correct endwise position on the table. The operator then centers the block on the table, and clamps it securely thereto by turning the crank T. The block being now secured properly to the table, the pressure upon lever M is removed and the table dropped, and the lever $x$ is seized and the saw U is elevated to cut through the bottom of the block on the bed-line. The table is next tilted into a more horizontal position by carrying its rear end to the lower end of rack $o$ by handle P, Fig. 2, and the saw is again lifted and made to cut through on the head-line. The table is then changed to about the center of the rack $o$, and the saw elevated once more to cut out the intermediate wood between the two former cuts, and the table is then secured in the middle hole of the rack in the position shown, and the wedge-gripe cut out with the chisels. This is done by having the chisels drawn in together, when the work is raised by the foot-lever M and the chisels spread by the hand-wheel I until they have cut out to the stop Z, Fig. 3. The work is then dropped and the angle of the table changed by tilting it to the upper hole of the rack $o$, when the table is again elevated by foot-lever, and the chisels $g$, starting from the center, cut the mortise out laterally on the bed-line until the stop Z is reached. The lower throat, $c$, Fig. 8, and the grooves $a\ a$ are then finished. After a lot of work has been run through the machine in this way the slabbing-chisels, Fig. 9, are adjusted in place of the chisels $g$, and the work is again run through and the mortises slabbed out, as shown by $b\ b$, Fig. 8, the slabbing-chisels being managed the same as the other set.

The slabbing-chisels are formed with an oblique edge, as seen in Fig. 9, so as to leave their cut fair with the head-line of the mortise, the said head-line being at an oblique angle with the line of the chisel's movement.

Having thus described my invention, what I claim as new, and desire to secure by Letters Patent, is—

1. The tool-carrying slide G G, guides H H, and spreading-wedge J, combined and adapted for lateral adjustment of the tools $g$, substantially as described.

2. The combination, with the tilting table, of the right and left screws S, and wheels $s\ s\ t$, arranged for operating both screws in same direction, and thereby operating clamps R R, substantially as described.

3. The adjustable stop Z, in combination with the rack and pinion $i\ j$, wedge J, and spreading-tool slide, and guides G H, substantially as and for the purpose described.

4. The combination and arrangement of the spreading head or slide G H, wedge J, rack and pinion $i\ j$, stop Z, table L, clamp R, and saw U, all constructed and operating substantially as and for the purpose described.

CHARLES CARTER.

Witnesses:
 AUG. HOWLAND,
 HENRY W. LEONARD.